United States Patent [19]

Ishikura et al.

[11] Patent Number: 5,585,821
[45] Date of Patent: Dec. 17, 1996

[54] APPARATUS AND METHOD FOR SCREEN DISPLAY

[75] Inventors: Shuji Ishikura, Hitachi; Takayuki Morioka, Katsuta; Atsuhiko Nishikawa, Mito; Kayo Takahashi, Hitachi; Norihito Kanno, Takahagi, all of Japan

[73] Assignees: Hitachi Ltd., Tokyo; Hitachi Process Computer Engineering, Inc., Hitachi, both of Japan

[21] Appl. No.: 575,441

[22] Filed: Dec. 20, 1995

Related U.S. Application Data

[63] Continuation of Ser. No. 209,131, Mar. 11, 1994, abandoned.

[30] Foreign Application Priority Data

Mar. 18, 1993 [JP] Japan .................................. 5-058392

[51] Int. Cl.⁶ .................................................. G09G 5/08
[52] U.S. Cl. .................................................. 345/145; 345/1
[58] Field of Search ...................................... 345/145, 157, 345/119, 1, 3, 7; 395/157, 159

[56] References Cited

U.S. PATENT DOCUMENTS

| | | | |
|---|---|---|---|
| 4,953,159 | 8/1990 | Hayden | 370/62 |
| 5,140,678 | 8/1992 | Torres | 395/159 |
| 5,283,562 | 2/1994 | Kaneko | 345/145 |

OTHER PUBLICATIONS

Stephen L. Michel "HyperCard", 1989, p. 36, 108, and 396–400.

*Primary Examiner*—Steven Saras
*Assistant Examiner*—Kent Chang
*Attorney, Agent, or Firm*—Kenyon & Kenyon

[57] ABSTRACT

An apparatus and a method of screen display whereby either a plurality of screens or a plurality of windows on a single screen are displayed. On at least one screen or in at least one window, areas representing either the other screens or the other windows are displayed. When a pointer pointing to a given position either on that one screen or in that one window is used to select any one of these areas therein, the pointer is made to appear either on another screen or in another window corresponding to the selected area.

17 Claims, 11 Drawing Sheets

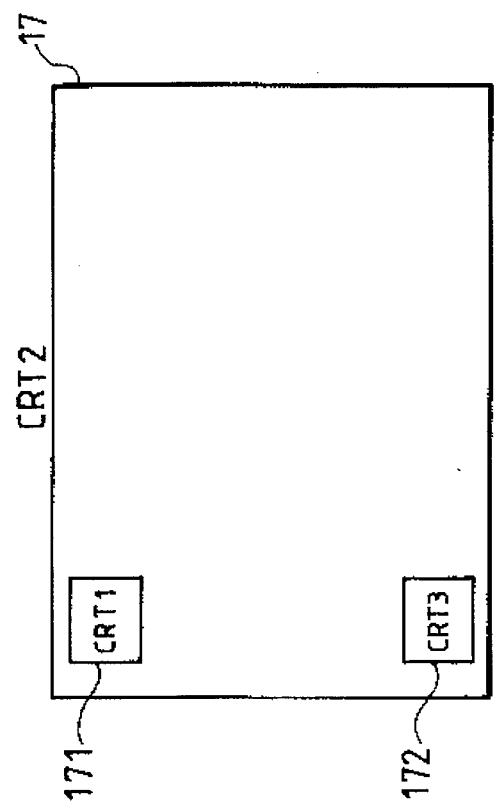
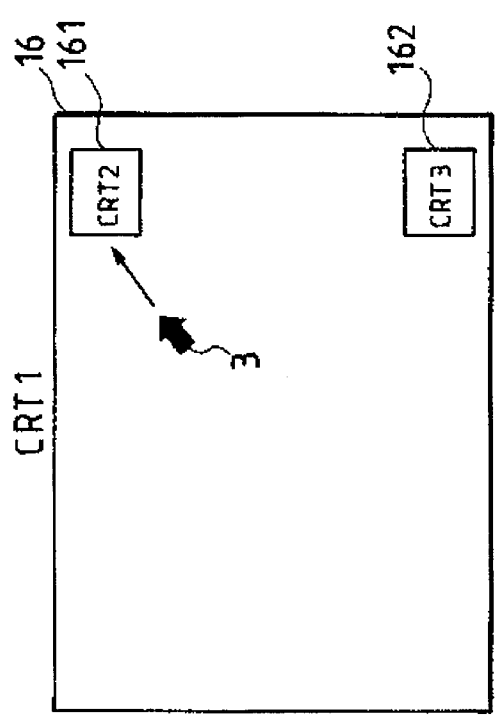
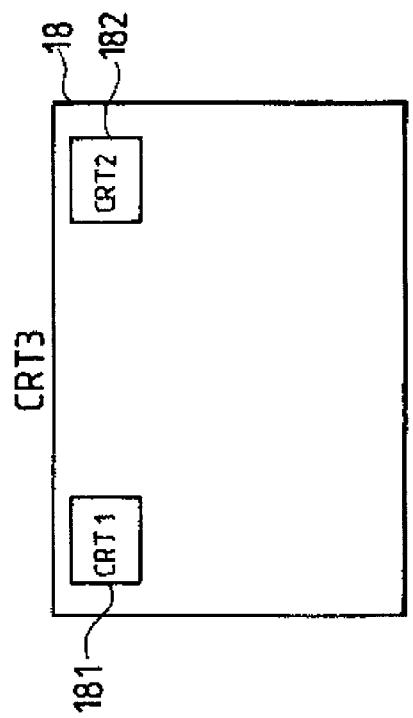
FIG. 3

FIG. 4
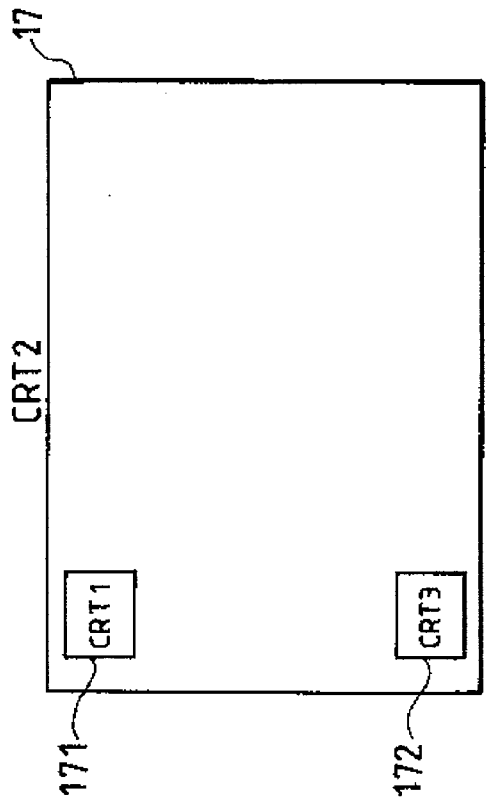
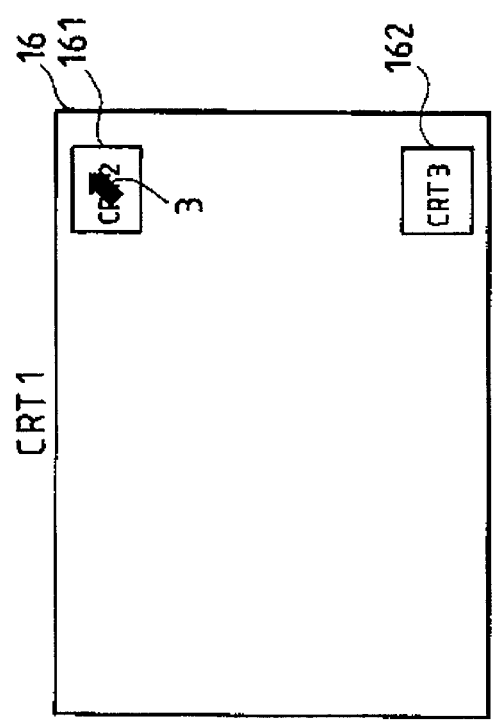
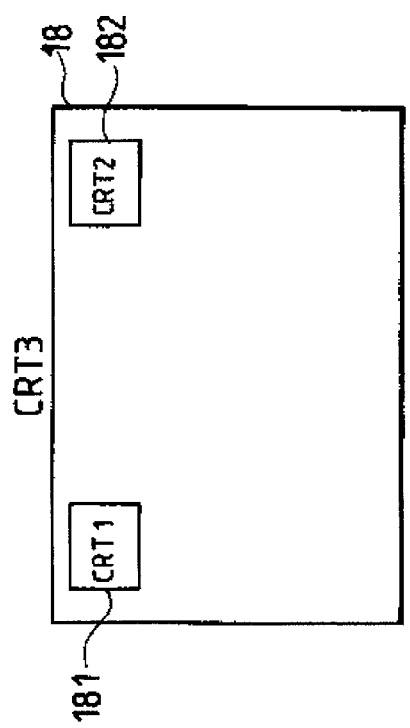

APPARATUS AND METHOD FOR SCREEN DISPLAY

This application is continuation of application Ser. No. 08/209,131, filed on Mar. 11, 1994 now abandoned.

BACKGROUND OF THE INVENTION

The present invention relates to an apparatus and a method for screen display.

In monitoring and controlling a plant or similar facilities, operators perform their tasks by monitoring a plurality of display apparatuses (e.g., CRT's) laid out in either a concentrated or distributed manner. The operator's task involves manipulating a cursor on the screen of the display apparatus for such diverse operations as entering and modifying information, magnifying and reducing the screen, and switching from one screen to another.

Recent years have seen a significant increase in the amount of information to be handled by each operator manning the plant. One operator has to monitor a plurality of display apparatuses and to operate the plant accordingly. This requires shifting the cursor from the screen of the currently used display apparatus to that of another display apparatus for continuous operation. The shifting of the cursor is accomplished illustratively by the technique disclosed in Japanese Patent Laid-Open No. 256125/1987. The technique involves getting the cursor to move out of the screen of the currently used display apparatus, when the cursor exceeds the display limits of the current screen, to the screen of another display apparatus. Using the pointing device such as a mouse, the operator moves the cursor while watching it on the screen of the display apparatus.

SUMMARY OF THE INVENTION

The present invention to provides an apparatus and a method for screen display offering the advantage of allowing the cursor to move across a plurality of display screens without the cursor getting out of sight of an operator where the multiple display apparatuses are distanced from one another or where the screen size differs from one display apparatus to another.

In carrying out the invention and according to one aspect thereof, there is provided a screen display method for displaying either a plurality of screens or a plurality of windows on a single screen. The method includes the steps of: displaying, either on at least one screen or in at least one window, areas representing either the other screens or the other windows; and causing, when a pointer pointing to a given position either on that one screen or in that one window is used to select any one of these areas therein, the pointer to appear either on another screen or in another window corresponding to the selected area.

Other features and advantages of the present invention will become apparent in the following specification and accompanying drawings.

BRIEF DESCRIPTION OF THE DRAWINGS

FIG. 3 is a view of typical displays provided according to the present invention.

FIG. 4 is another view of typical displays provided according to the present invention.

DETAILED DESCRIPTION

Figure 1:
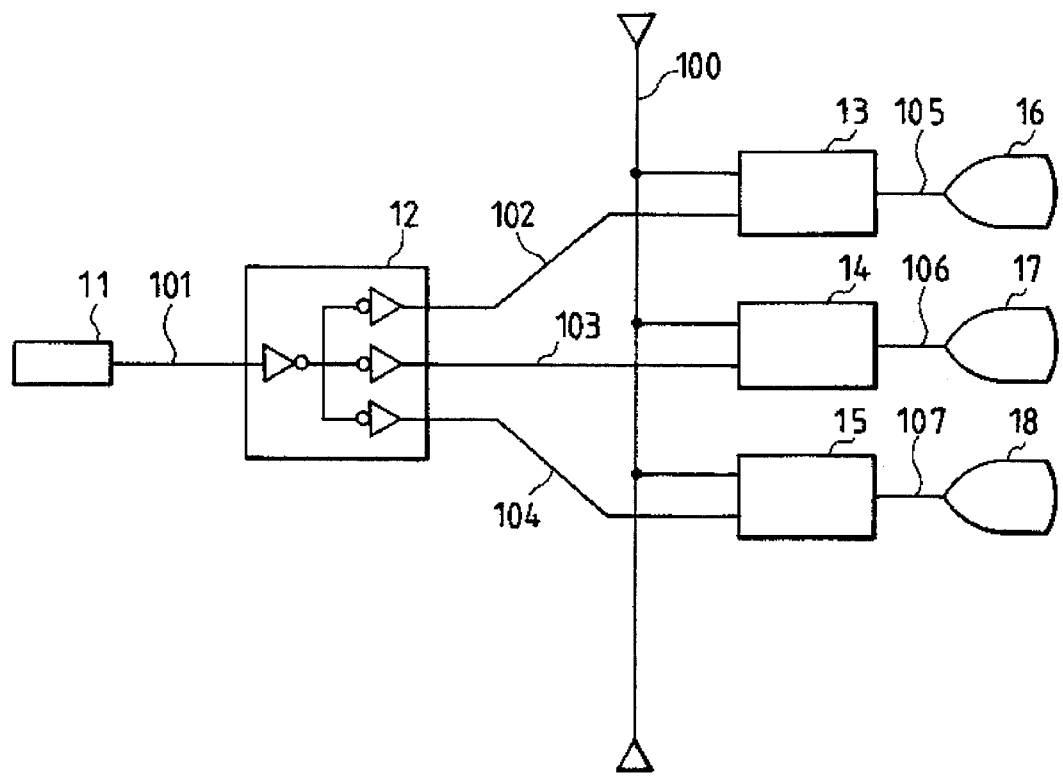
FIG. 1 is a block diagram of a system configuration to which the present invention is applied.

Preferred embodiments of the invention will now be described with reference to the accompanying drawings. FIG. 1 is a block diagram of a system configuration to which the present invention is applied. A mouse 11, which is a pointing device, is connected to a distributor 12 via a mouse interface bus 101. The distributor 12 takes the input signal from the mouse 11 (i.e., mouse interface signal) and distributes the signal to terminals 13 through 15 via mouse interface buses 102 through 104, respectively. The terminals 13 through 15 correspond respectively to display apparatuses 16 through 18 (i.e., CRT's 1–3) and control the screens thereof using video signals 105, 106 and 107 flowing over buses. A communication interface signal that flows over a communication bus 100 allows the terminals to communicate with one another, whereby the screen displays are controlled between the present terminals.

Figure 2:
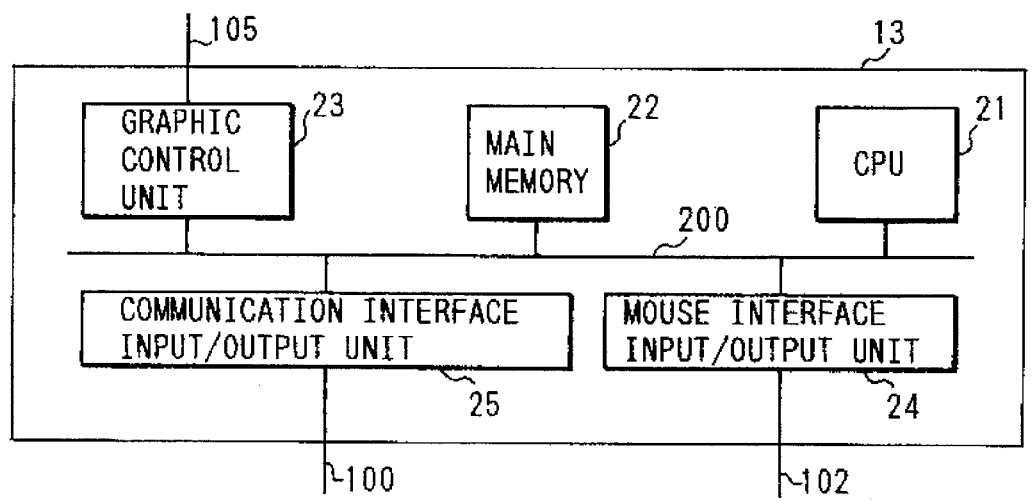
FIG. 2 is a block diagram of a terminal configured according to the present invention.
Figure 5:
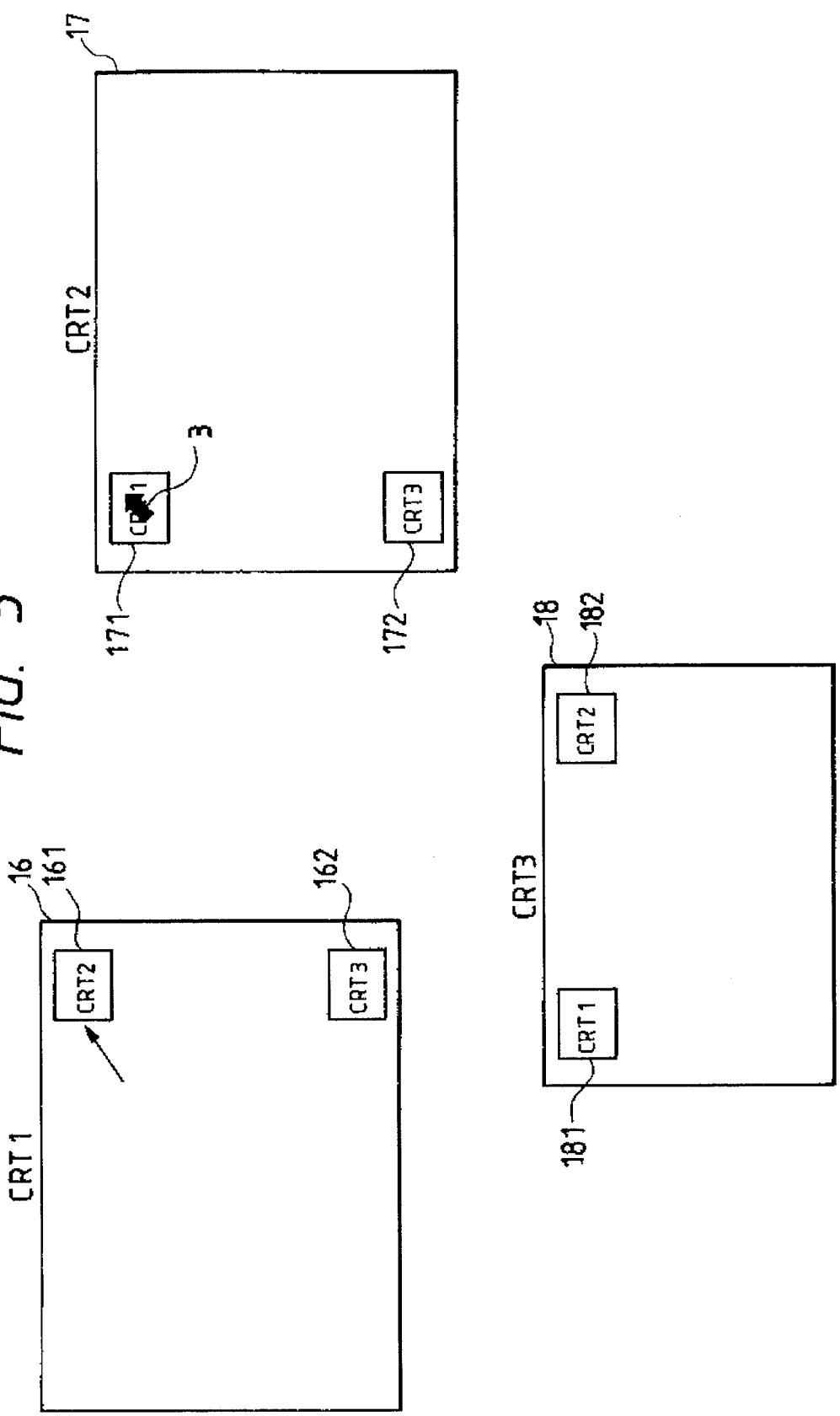
FIG. 5 is another view of typical displays provided according to the present invention.

FIG. 2 is a block diagram of the terminal 13 configured according to the invention. In FIG. 2, reference numeral 21 indicates a CPU that provides display control of the display apparatus 16 (CRT 1), and reference 22 is a main memory that contains display control programs and registers to be accessed by the CPU 21. Reference numeral 23 denotes a graphic control unit that accommodates display data for the display apparatus 16 (CRT 1), generates the video signal 105, and transmits the signal 105 to the display apparatus 16. Reference numeral 24 represents a mouse interface input/output unit that receives cursor movement quantity data and movement direction data sent from the mouse 11 over the mouse interface bus 102. Reference numeral 25 stands for a communication interface input/output unit that allows the CPU 21 to receive and output communication information regarding the other terminals 14 and 15 the information being exchanged over the communication bus 100. As part of its display control capabilities, the CPU 21 controls cursor movements and other display-related operations using the data from the mouse 11 (sent as the mouse interface signal over the mouse interface bus 102) and the communication information about the other terminals 14 and 15 (sent over the communication bus 100).

Although FIG. 2 outlines the constitution of the terminal 13 alone, the constitution is common to the terminals 14 and 15 as well.

Below is a description of typical displays with reference to FIGS. 3 through 8. In FIG. 3, the display apparatuses 16 through 18 (CRT's 1–3) of different sizes are distanced from one another and laid out in an irregular manner. In such an environment, an attempt to move a cursor 3 from the display apparatus 16 (CRT 1) to, say, the display apparatus 16 (CRT 2) can result in losing sight of the cursor 3.

Reference numerals 161 and 162 are icon display areas provided on the display apparatus 16 (CRT 1); 171 and 172 are icon display areas on the display apparatus 17 (CRT 2); and 181 and 182 are icon display areas on the display apparatus 18 (CRT 3). These icon display areas on each display apparatus are arranged to correspond on a one-to-one basis to the other display apparatuses configured. Characters or other appropriate markings are used to indicate which icon display area corresponds to which display apparatus.

The cursor 3 is displayed initially on the display apparatus 16 (CRT 1). Suppose that the mouse 11 is used to move the cursor 3 on the CRT 1 up to the icon display area 161 thereof (FIG. 4) representing the display apparatus 17 (CRT 2). When the cursor 3 is placed in the icon display area 161, the cursor 3 is then switched to the display apparatus 17 (CRT 2) and moved to the icon display area 171 thereof (FIG. 5) corresponding to the display apparatus 16 (CRT 1). The characters in the icon display areas 161 and 171 overlap with the cursor 3 in such a manner that the characters not hidden by the cursor 3 remain displayed as they are. When the cursor 3 is moved from the CRT to the CRT 1, the reverse of what was described above takes place.

Figure 9:
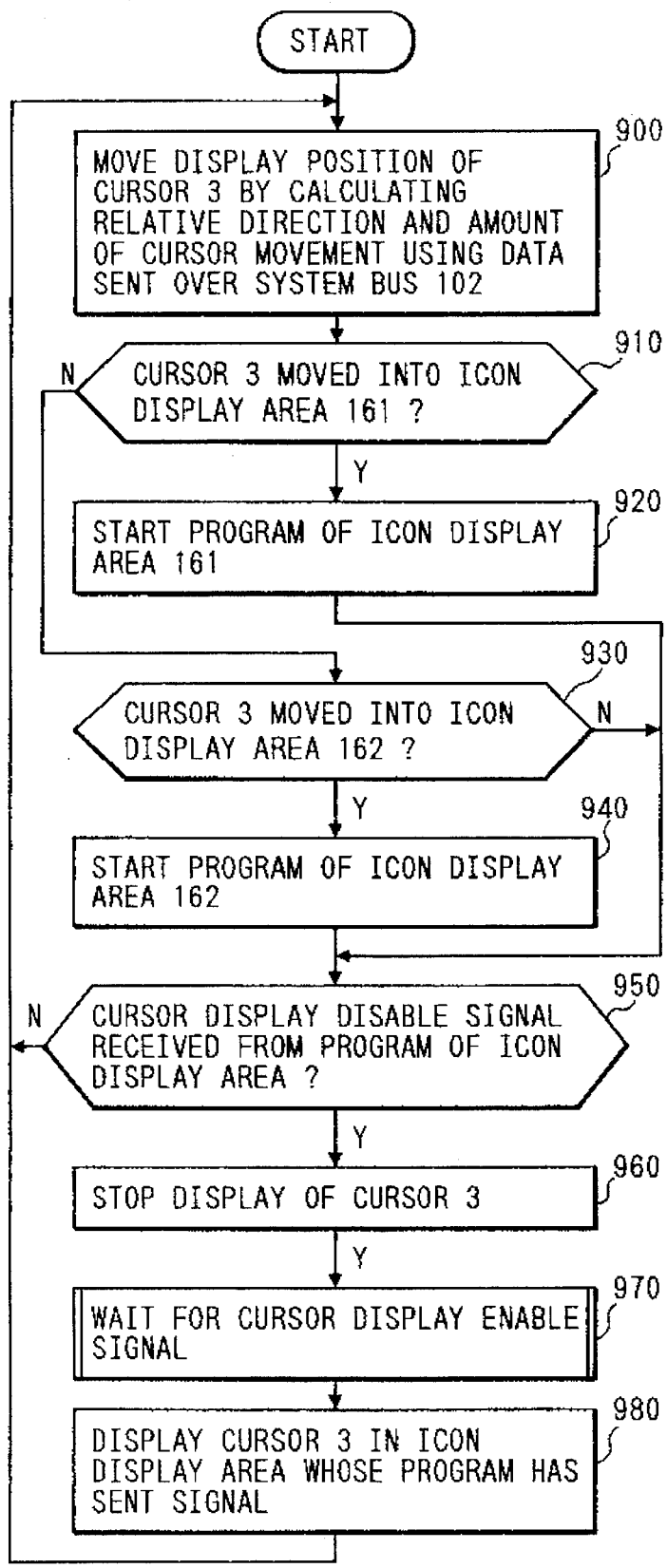
FIG. 9 is a flowchart of steps in which a cursor control program embodying the present invention operates.
Figure 10:
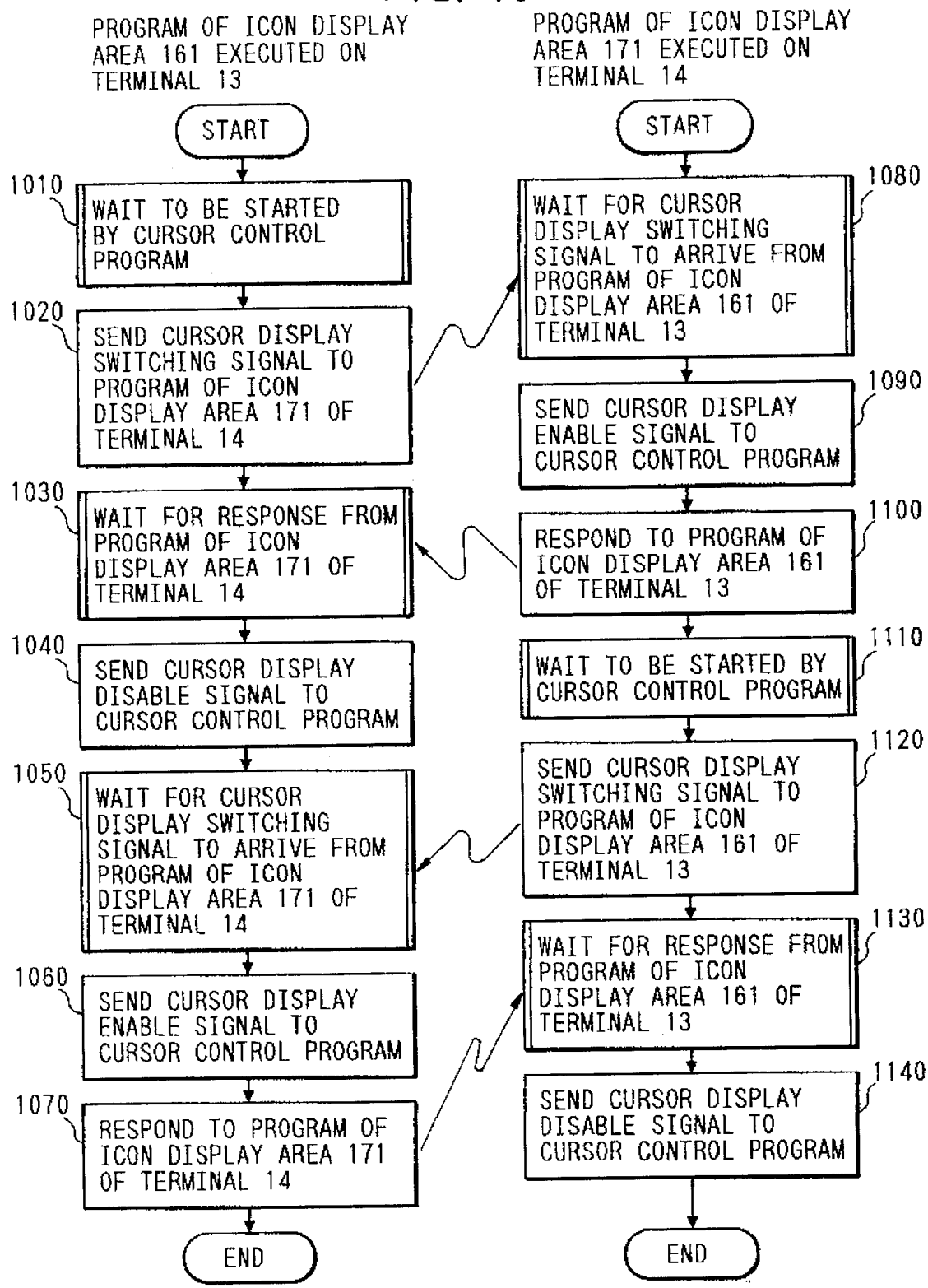
FIG. 10 is a flowchart of steps in which the program of an icon display area 161 and the program of an icon display area 171 operate, the two programs also embodying the present invention.

How the cursor is moved from one display apparatus to another will now be described with reference to FIGS. 9 and 10. FIG. 9 is a flowchart of steps in which a cursor control program works on the terminal 13. At the outset, the terminal 13 displays the cursor 3 on the display apparatus 16. When the cursor 3 is moved by the mouse 11 from its current position, the cursor control program of the terminal 13 calculates the direction and the amount of the movement by use of the data included in the mouse interface signal sent from the mouse 11 over the mouse interface bus 102; the display position of the cursor 3 is then moved accordingly (step 900). A check is made to see if the display position of the cursor 3 is moved onto the icon display area 161 (step 910). If the cursor 3 is found to be in the icon display area 161, the program of the icon display area 161 is started so as to move the cursor 3 (step 920). A check is made to see if a disable signal for ending the display of the cursor 3 has come from the program corresponding to any one of the icon display areas (step 950). If no such disable signal is detected, step 900 is reached again. If the disable signal for ending the display of the cursor 3 does exist, the display of the cursor 3 on the display apparatus 16 (CRT 1) is stopped (step 960). From an icon display area program, the cursor control program waits for an enable interrupt signal for starting cursor display (step 970). If the enable interrupt signal is detected, the cursor 3 is displayed in the icon display area whose program has issued the interrupt (step 980), and step 900 is reached again. Although the above flow of steps pertains to cursor control of the terminal 13 alone, the cursor control programs of the terminals 14 and 15 also follow the same steps for cursor control.

What follows is a description of how the display of the cursor 3 is switched from the display apparatus 16 (CRT 1) to the display apparatus 17 (CRT 2). FIG. 10 is a flowchart of steps in which the program of the icon display area 161 and that of the icon display area 171 operate. The program of the icon display area 161 waits to be started by the cursor control program of the terminal 13 when the cursor 3 moved by the mouse 11 over the display apparatus 16 (CRT 1) reaches the icon display area 161 (step 1010). Placing the cursor 3 in the icon display area 161 starts the cursor control program of the terminal 13 in control of that area, which in turn starts the program of the icon display area 161. The program of the icon display area 161, when started, sends a cursor display switching signal to the program of the icon display area 171 of the terminal 14 using the communication interface signal over the communication bus 100 (step 1020). The program of the icon display area 171 waits for a cursor display switching signal to arrive (step 1080). Upon receipt of the switching signal, the program of the icon, display area 171 sends a cursor display enable signal to the cursor control program of the terminal 14 (step 1090). When the cursor 3 is displayed in the icon display area 171 of the display apparatus 17 (CRT 2), the program of the icon display area 171 responds to the program of the icon display area 161 of the terminal 13 by sending thereto the communication interface signal over the system bus 100 (step 1100). The program of the icon display area 161 waits for a response from the program of the icon display area 171 (step 1030). Upon receipt of the response signal, the program of the icon display area 161 sends a cursor display disable signal to the cursor control program of the terminal 13 (step 1040). The above steps cause the cursor 3 to be switched from the display apparatus 16 (CRT 1) to the display apparatus 17 (CRT 2).

The program of the icon display area 171 waits to be started by the cursor control program of the terminal 14 when the cursor 3 moved by the mouse 11 over the display apparatus 17 (CRT 2) reaches the icon display area 171 (step 1110). Placing the cursor 3 in the icon display area 171 starts the cursor control program of the terminal 14 in control of that area, which in turn starts the program of the icon display area 171. The program of the icon display area 171, when started, sends a cursor display switching signal to the program of the icon display area 161 of the terminal 13 using the communication interface signal over the communication bus 100 (step 1120). The program of the icon display area 161 waits for a cursor display switching signal to arrive (step 1050). Upon receipt of the switching signal, the program of the icon display area 161 sends a cursor display enable signal to the cursor control program of the terminal 13 (step 1060). When the cursor 3 is displayed in the icon display area 161 of the display apparatus 16 (CRT 1), the program of the icon display area 161 responds to the program of the icon display area 171 of the terminal 14 by sending thereto the communication interface signal over the communication bus 100 (step 1070). The program of the icon display area 171 waits for a response from the program of the icon display area 161 (step 1130). Upon receipt of the response signal, the program of the icon display area 171 sends a cursor display disable signal to the cursor control program of the terminal 14 (step 1140). The above steps cause the cursor 3 to be switched from the display apparatus 17 (CRT 2) to the display apparatus 16 (CRT 1).

In a multiple display apparatus setup, the above embodiments move the cursor 3 from the currently used display apparatus (CRT) to any other display apparatus desired without losing sight of the cursor even if the configured apparatuses (CRT'S) of different sizes are distanced from one another and laid out irregularly. This in turn allows the plant or like facilities in question to be operated smoothly.

Figure 6:
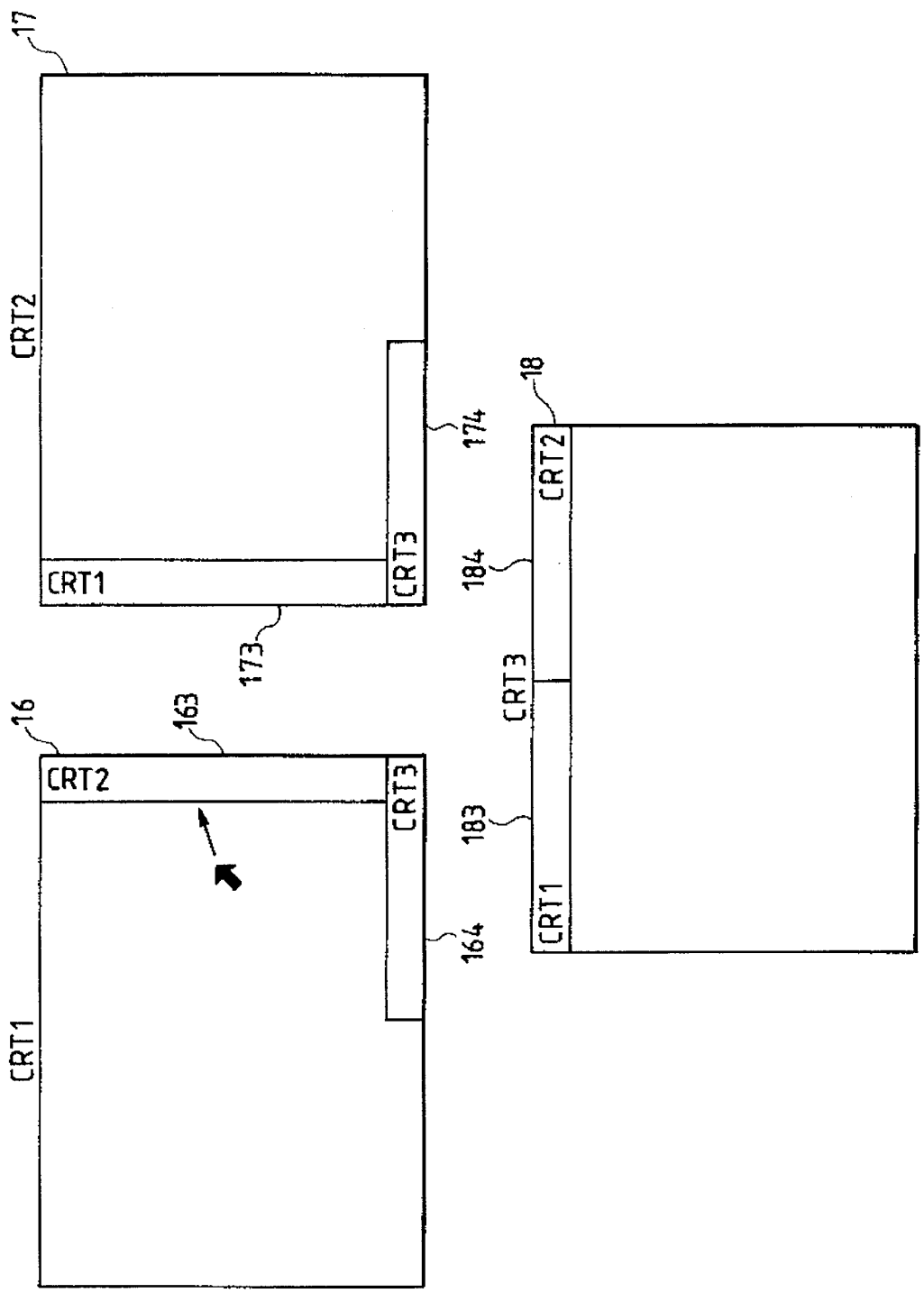
FIG. 6 is another view of typical displays provided according to the present invention.
Figure 7:
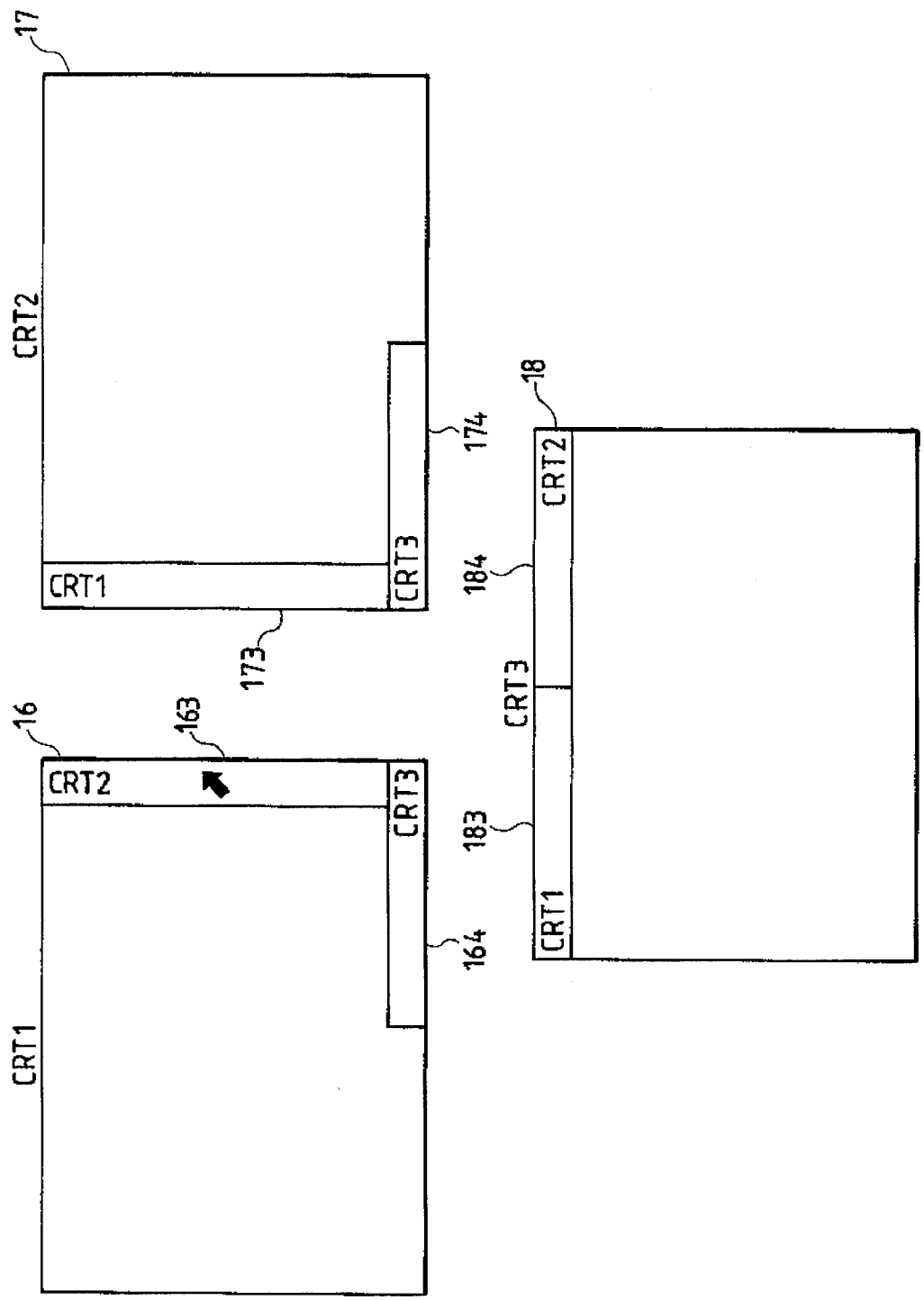
FIG. 7 is another view of typical displays provided according to the present invention.
Figure 8:
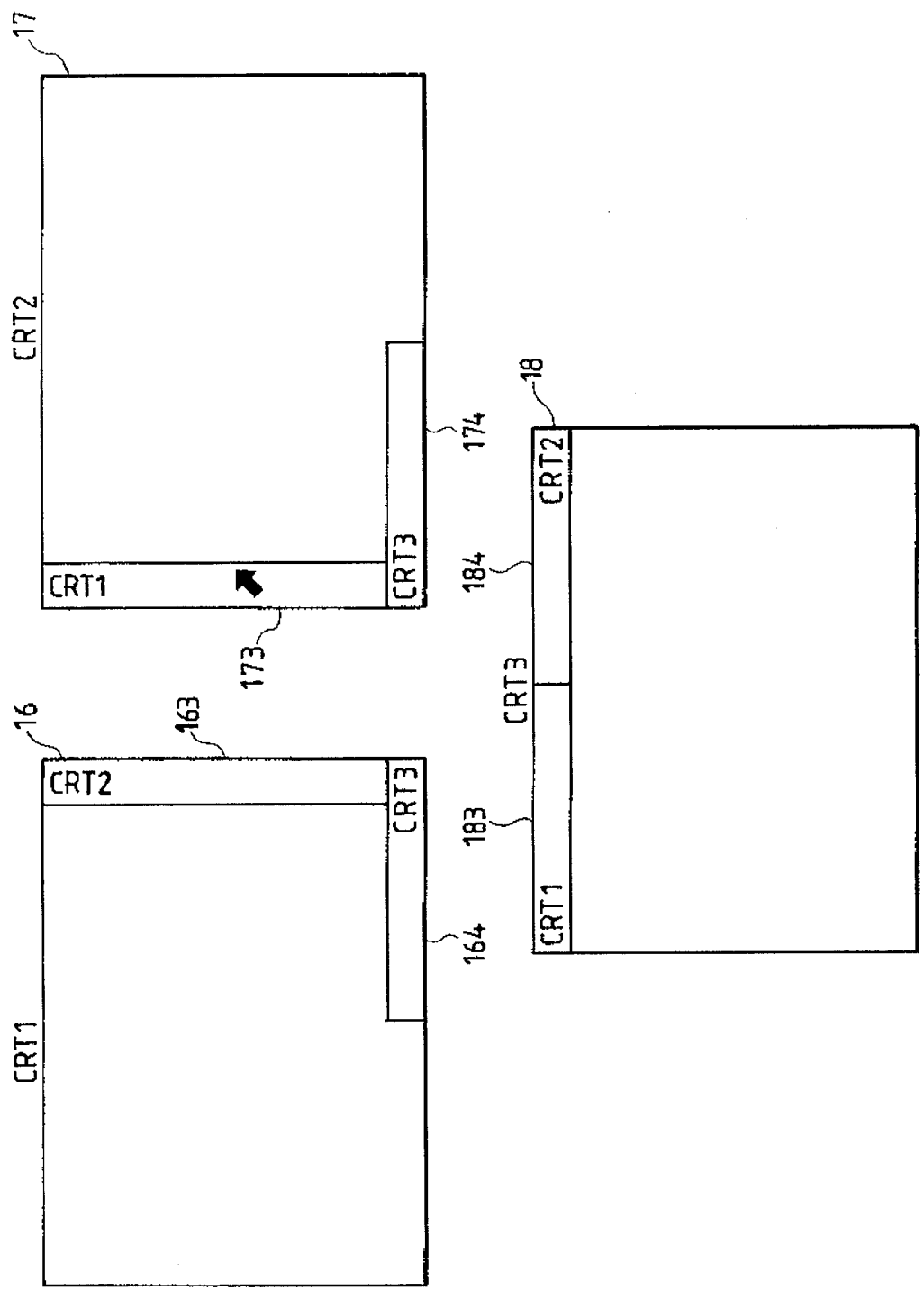
FIG. 8 is another view of typical displays provided according to the present invention.

Another embodiment of the present invention will now be described with reference to FIGS. 6 through 8. In FIG. 6, the display apparatuses 16 through 18 (CRT's 1–3) are laid out close to one another.

Reference numerals 163 and 164 on the display apparatus 16 (CRT 1), numerals 173 and 174 on the display apparatus 17 (CRT 2), and numerals 183 and 184 on the display apparatus 18 (CRT 3) represent display areas designating cursor destinations. These display areas on each display apparatus are arranged to correspond on a one-to-one basis to the other display apparatuses configured. Characters or other appropriate markings are used to indicate which display area corresponds to which display apparatus.

The cursor 3 is displayed initially on the display apparatus 16 (CRT 1). Suppose that the mouse 11 is used to move the cursor 3 up to the display area 163 (FIG. 7) representing the display apparatus 17 (CRT 2). When the cursor 3 is placed in the display area 163, the cursor 3 is then switched to the display apparatus 17 (CRT 2) and moved to the display area 173 thereof (FIG. 8) corresponding to the display apparatus 16 (CRT 1).

The embodiment above applied in a multiple display apparatus setup also moves the cursor 3 from the currently used display apparatus (CRT) to any other display apparatus desired without losing sight of the cursor. This in turn allows the plant or like facilities in question to be operated smoothly.

A further embodiment of the invention will now be described. In any of the embodiments described above, placing the cursor by error into an unintended icon display area or display area for designating cursor destination on the currently used display apparatus (CRT) transfers the cursor inadvertently to the corresponding display apparatus (CRT). This drawback is circumvented by the embodiment requiring the operator to operate a button of the mouse 11 after verifying the movement of the cursor 3 into the desired icon display area or display area for designating cursor destination. After verification, operating the button of the mouse 11 transfers the cursor 3 to the intended display apparatus (CRT).

Figure 11:
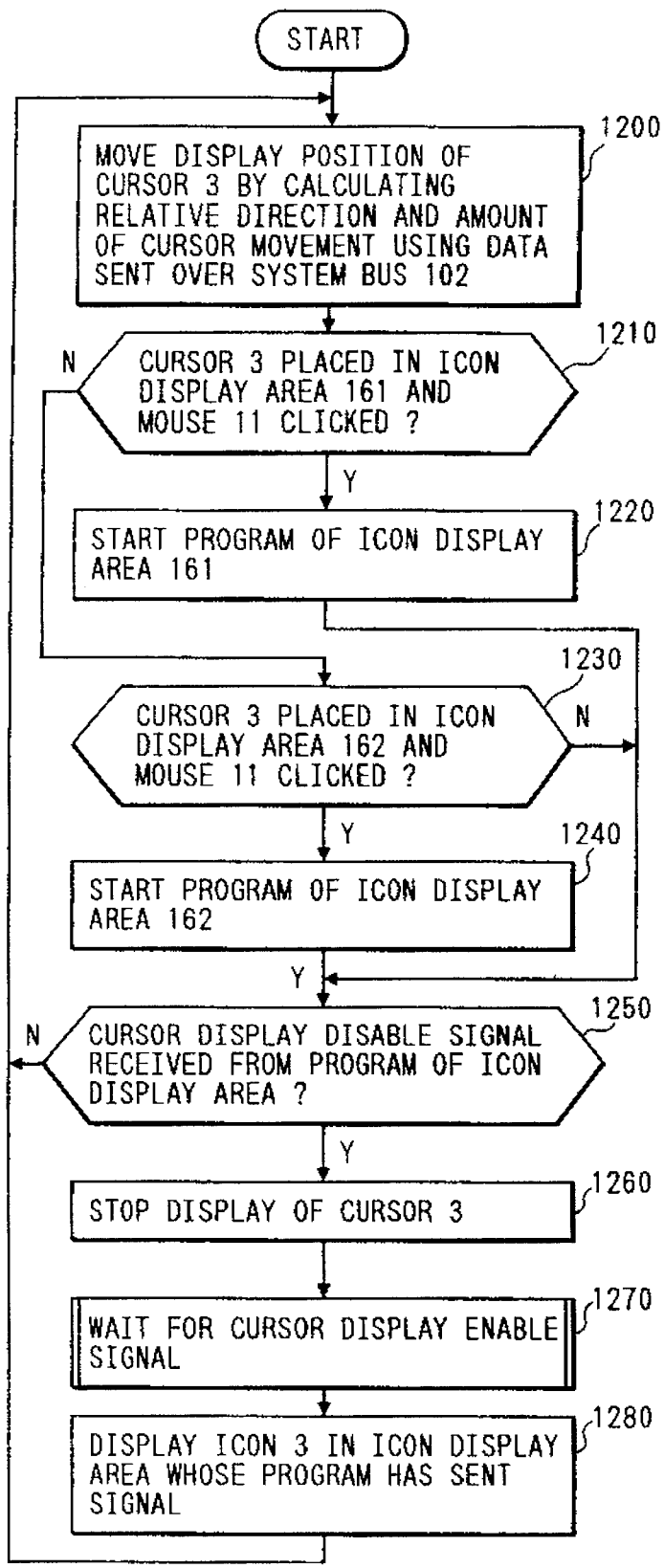
FIG. 11 is a flowchart of steps in which another cursor control program embodying the present invention operates.

FIG. 11 is a flowchart of steps in which an alternative cursor control program of the terminal 13 operates. At the outset, the terminal 13 displays the cursor 3 on the display apparatus 16. When the cursor 3 is moved by the mouse 11 from its current position, the cursor control program of the terminal 13 calculates the direction and the amount of the movement by use of the data included in the mouse interface signal sent from the mouse 11 over the mouse interface bus 102; the display position of the cursor 3 is then moved accordingly (step 1200). A check is made to see if the display position of the cursor 3 is moved onto the icon display area 161, and if the mouse 11 is clicked (step 1210). If the cursor 3 is found to be in the icon display area 161, the program of the icon display area 161 is started to move the cursor 3 (step 1220). A check is made to see if a disable signal for ending the display of the cursor 3 has come from the program corresponding to any one of the icon display areas (step 1250). If no such disable signal is detected, step 1200 is reached again. If the cursor display disable signal does exist, the display of the cursor 3 on the display apparatus 16 (CRT 1) is stopped (step 1260). From an icon display area program, the cursor control program waits for interruption with a cursor display enable signal (step 1270). If the cursor display enable signal is detected, the cursor 3 is displayed in the icon display area whose program has issued the interrupt (step 1280), and step 1200 is reached again. Although the above flow of steps pertains to cursor control of the terminal 13 alone, the cursor control programs of the terminals 14 and 15 also follow the same steps for cursor control. By requiring the operator to click the mouse 11 to designate the desired display apparatus, this embodiment prevents the cursor 3 from moving inadvertently to another display apparatus (CRT) if the cursor is placed by error into an unintended icon display area or display area for designating cursor destination.

Figure 12:
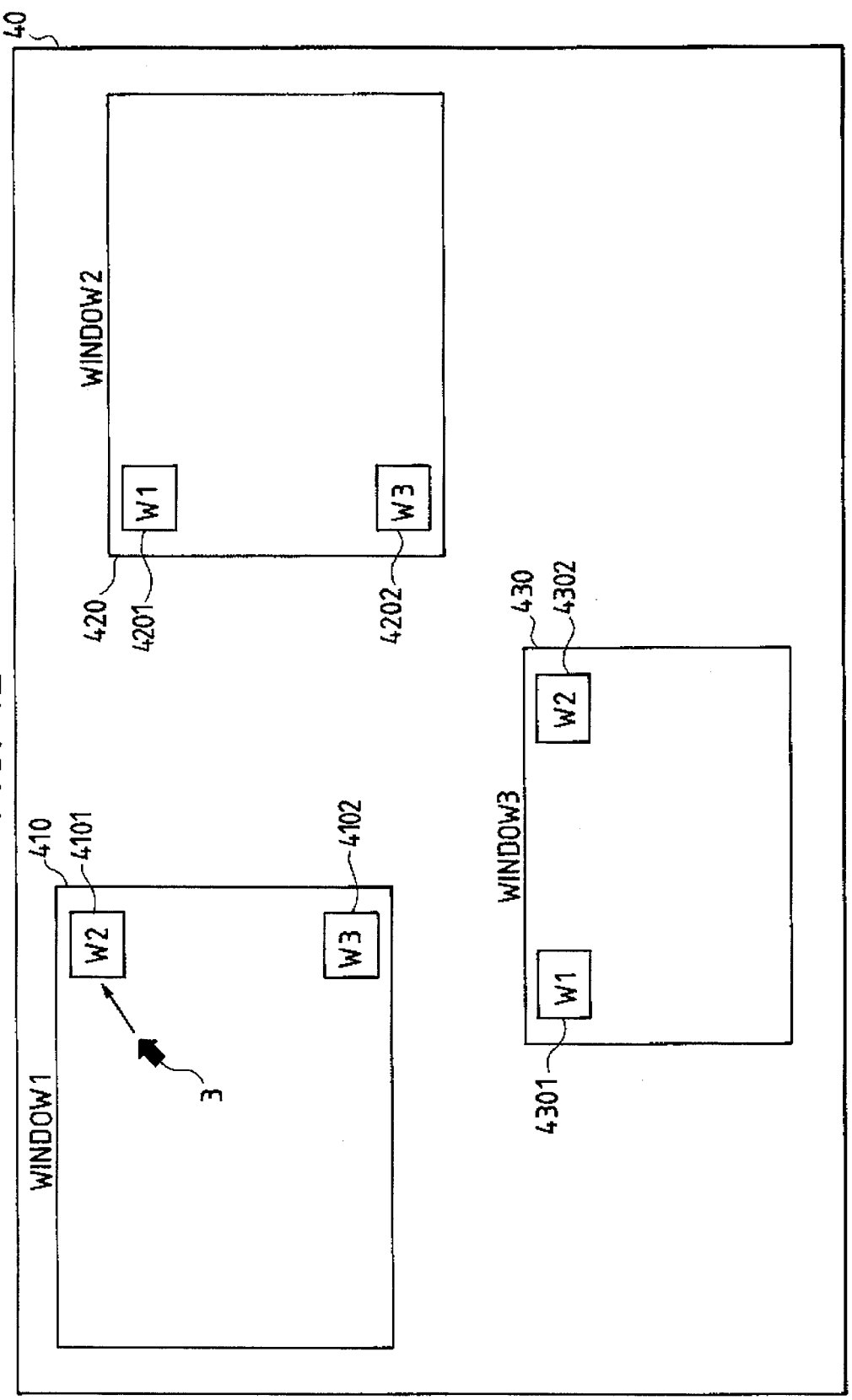
FIG. 12 is a view of typical windows that appear on a display apparatus embodying the present invention.

Although the embodiments above pertain to multiple display screen setups, they may also be applied to cases such as one in FIG. 12 where a plurality of windows 410, 420 and 430 appear on the screen of a single display apparatus 40, the windows comprising a plurality of icon display areas 4101, 4102, 4201, 4202, 4301 and 4302.

As described, the invention is applied to cases where a pointer (e.g., cursor) pointing to a given position on a first display screen or in a first window of a single screen is to be moved to a second display screen or a second window different from the first. In such cases, the invention as embodied above causes the pointer to appear on the second screen or in the second window when the pointer on the first screen or in the first window is placed in a particular area therein representing the second display screen or second window which is the destination of the cursor. The invention thus allows the operator to see easily to or from which display screen or window the pointer has been transferred. There is no possibility of the operator losing sight of the pointer between screens or windows.

When the cursor is moved from the first display screen to the second by placing the cursor in the icon display area corresponding to the latter, the cursor moved to the second display screen is found in the area thereof corresponding to the first display screen. This makes it easy for the operator to see to or from which display screen the cursor has been transferred. There is no possibility of the operator losing sight of the cursor between display apparatuses. When applied to the information input/output section of the plant or like facilities, the invention enhances the operability and safety of the plant.

As many apparently different embodiments of this invention may be made without departing from the spirit and scope thereof, it is to be understood that the invention is not limited to the specific embodiments thereof except as defined in the appended claims.

What is claimed is:

1. A cursor display method for displaying a cursor on either a plurality of screens located in close proximity to each other, or on a plurality of windows on a single screen, simultaneously viewable by operator and in which each of said screens or windows can simultaneously display useable information to the operator, the method comprising the steps of:

displaying, either on each screen or in each window, areas representing either the other screens or the other windows;

displaying a cursor in one of said areas, said area representing a destination screen or destination window of the cursor; and moving the cursor to one of said areas in said destination screen or destination window, that area in said destination screen or destination window representing a starting screen or starting window of the cursor.

2. The method of claim 1 wherein each of the areas on said screen representing other screens or other windows are positioned on said screen in a manner corresponding to the relative position of the corresponding other screen or window with respect to said screen.

3. The method of claim 1 wherein said screens or windows do not intersect one another.

4. A cursor display method for displaying a cursor on a plurality of screens located in close proximity to each other and simultaneously viewable by an operator, comprising the steps of:

provided at least one icon display area in predetermined positions of each of a plurality of display screens;

monitoring whether a cursor on a first display screen is moved into one icon display area thereof; and displaying, when said cursor is found to be moved into said one icon display area, said cursor in an icon display area representing said first display screen on a second display screen.

5. The method of claim 4 wherein said icon display on said first display screen which represents said second display screen is positioned on said first display screen in a manner corresponding to the relative position of the second display screen to said first display screen.

6. The method of claim 4 wherein said display screens do not intersect one another.

7. A cursor display method for displaying a cursor on a plurality of screens located in close proximity to each other and simultaneously viewable by an operator, comprising the steps of:

providing at least one icon display area in predetermined positions of each of a plurality of display screens; and when an operator uses a pointing device to move the cursor into an icon display area on a first display screen moving said cursor, from said one icon display area of said first display screen into an icon display area representing said first display screen on a second display screen that is different from said first display screen on condition that the moving of said cursor is prompted by said operator using said pointing device.

8. The method of claim 7 wherein said icon display on said first display screen which represents said second display screen is positioned on said first display screen in a manner corresponding to the relative position of the second display screen to said first display screen.

9. The method of claim 7 wherein said display screens do not intersect one another.

10. A cursor display method for displaying a cursor on a plurality of screens located in close proximity to each other and simultaneously viewable by an operator, comprising the steps of:

providing a special area in a predetermined position of each of a plurality of display screens;

monitoring whether a cursor on a first display screen is moved into said special area thereof; and when said cursor is found to be moved into said special area, moving the cursor from said first display screen to a special area representing said first display screen on a second display screen different from said first display screen.

11. The method of claim 10 wherein said predetermined position of each said special area is defined by the relative position of the display screen that the area represents to the display screen on which the area appears.

12. The method of claim 10 wherein said display screens do not intersect one another.

13. A cursor display method for displaying a cursor on a plurality of screens located in close proximity to each other and simultaneously viewable by an operator, comprising the steps of:

providing a special area in a predetermined position of each of a plurality of display screens; and when an operator uses a pointing device to move the cursor into said special area on a first display screen, moving the cursor from said special area of said first display screen into a special area representing said first display screen on a second display screen different from said first display screen on condition that the moving of said cursor is prompted by said operator using said pointing device.

14. The method of claim 13 wherein said predetermined position of each said special area is defined by the relative position of the display screen that the area represents to the display screen on which the area appears.

15. The method of claim 13 wherein said display screens do not intersect one another.

16. A screen display apparatus comprising:

a display;

a processor operating on data to be displayed on said display;

a memory storing either programs or the data to be operated on by said processor;

a communication device enabling said processor to exchange the result of the operation performed by said processor with other processors; and a display controller providing displays to said display in accordance with the result of the operation by said processor;

wherein said programs display, either on a screen of said display or in a window of a screen, areas representing either display screens or windows of other display screens connected by said communication device, said display screens or windows of other display screens located in close proximity to each other and simultaneously viewable by an operator and each of said screens or windows able to simultaneously display useful information to the operator, said programs further displaying a pointer, if said pointer points to any one of said areas, in either the display screen or in the window of the display screen corresponding to the area that is pointed to and when said pointer is displayed in the window or screen pointed to, it appears in an area representing the screen or window from which the pointer was received.

17. A cursor display method for displaying a cursor on a plurality of screens located in close proximity to each other and simultaneously viewable by an operator, the method comprising the steps of:

displaying, on each screen, areas representing the other screens;

displaying a cursor in one of said areas, said area representing a destination screen of the cursor; and moving the cursor to one of said areas in said destination screen, that area in said destination screen representing a starting screen or starting window of the cursor.

* * * * *

UNITED STATES PATENT AND TRADEMARK OFFICE
CERTIFICATE OF CORRECTION

PATENT NO. : 5,585,821
DATED : 17 December 1996
INVENTOR(S) : Shuji ISHIKURA et al.

It is certified that error appears in the above-indentified patent and that said Letters Patent is hereby corrected as shown below:

| Column | Line | |
|--------|------|---|
| 1 | 38 | After "invention" delete "to". |
| 2 | 43 | Before "invention" insert --present--. |

Signed and Sealed this

Sixth Day of May, 1997

Attest:

BRUCE LEHMAN

Attesting Officer     Commissioner of Patents and Trademarks